United States Patent
Wakui et al.

(10) Patent No.: US 10,276,863 B2
(45) Date of Patent: Apr. 30, 2019

(54) NON-STOICHIOMETRIC TITANIUM COMPOUND-CARBON COMPOSITE, METHOD FOR PRODUCING SAME, NEGATIVE ELECTRODE ACTIVE MATERIAL AND LITHIUM ION SECONDARY BATTERY

(71) Applicants: Kuraray Co., Ltd., Kurashiki-shi (JP); Incorporated National University Iwate University, Morioka-shi (JP)

(72) Inventors: Takashi Wakui, Kurashiki (JP); Naoki Fujiwara, Kurashiki (JP); Yuhi Shimazumi, Chiyoda-ku (JP); Yoshio Yamamoto, Chiyoda-ku (JP); Koichi Ui, Morioka (JP); Yoshihiro Kadoma, Morioka (JP)

(73) Assignees: KURARAY CO., LTD., Kurashiki-shi (JP); INCORPORATED NATIONAL UNIVERSITY IWATE UNIVERSITY, Morioka-shi (JP)

( * ) Notice: Subject to any disclaimer, the term of this patent is extended or adjusted under 35 U.S.C. 154(b) by 598 days.

(21) Appl. No.: 14/963,896

(22) Filed: Dec. 9, 2015

(65) Prior Publication Data
US 2016/0164083 A1 Jun. 9, 2016

Related U.S. Application Data

(63) Continuation of application No. PCT/JP2014/065652, filed on Jun. 12, 2014.

(30) Foreign Application Priority Data

Jun. 14, 2013 (JP) ................................. 2013-125293

(51) Int. Cl.
*H01M 4/36* (2006.01)
*H01M 4/485* (2010.01)
(Continued)

(52) U.S. Cl.
CPC .......... *H01M 4/366* (2013.01); *C01G 23/005* (2013.01); *H01M 4/131* (2013.01); *H01M 4/485* (2013.01);
(Continued)

(58) Field of Classification Search
None
See application file for complete search history.

(56) References Cited

U.S. PATENT DOCUMENTS

| | | | |
|---|---|---|---|
| 2011/0217593 A1 | 9/2011 | Dollinger et al. | |
| 2011/0262809 A1 | 10/2011 | Kumagai et al. | |
| 2012/0107695 A1* | 5/2012 | Lee | H01M 4/13 429/314 |

FOREIGN PATENT DOCUMENTS

| | | |
|---|---|---|
| CN | 102186775 A | 9/2011 |
| JP | 2006-221881 | 8/2006 |

(Continued)

OTHER PUBLICATIONS

Kavan. "Li Insertion into Li4Ti5O 12 (Spinel) Charge Capability vs. Particle Size in Thin-Film Electrodes". Journal of the Electrochemical Society. A1000-A1007 ~2003 (Year: 2003).*

(Continued)

*Primary Examiner* — Sarah A. Slifka
*Assistant Examiner* — Haroon S. Sheikh
(74) *Attorney, Agent, or Firm* — Oblon, McClelland, Maier & Neustadt, L.L.P.

(57) ABSTRACT

A composite material including a carbon-containing material and a non-stoichiometric titanium compound shown by a chemical formula of $Li_{4+x}Ti_{5-x}O_{12}$, where x is in a range of 0<x<0.30, the composite material including at least one composite particle that has a core portion including the non-stoichiometric titanium compound and a mixed layer formed on a surface of the core portion, the mixed layer (Continued)

including non-stoichiometric titanium compound and carbon, and having an atomic ratio of titanium and carbon in a range of Ti/C=1/50 or more.

11 Claims, 8 Drawing Sheets

(51) Int. Cl.
*H01M 4/587* (2010.01)
*H01M 10/0525* (2010.01)
*H01M 4/131* (2010.01)
*H01M 4/62* (2006.01)
*C01G 23/00* (2006.01)

(52) U.S. Cl.
CPC ........... *H01M 4/587* (2013.01); *H01M 4/625* (2013.01); *C01P 2004/04* (2013.01); *C01P 2004/61* (2013.01); *C01P 2004/80* (2013.01); *C01P 2006/12* (2013.01); *C01P 2006/40* (2013.01); *H01M 10/0525* (2013.01); *H01M 2220/30* (2013.01)

(56) References Cited

FOREIGN PATENT DOCUMENTS

| JP | 2009-238656 | 10/2009 |
|---|---|---|
| JP | 2010-129440 | 6/2010 |
| JP | 2012-30988 | 2/2012 |
| JP | 2012-505137 | 3/2012 |
| TW | 201024222 A1 | 7/2010 |
| WO | WO 2010/052950 A1 | 5/2010 |

OTHER PUBLICATIONS

JP2009238656—Machine Translation (Year: 2009).*
Combined Chinese Office Action and Search Report dated Jan. 3, 2017 in Chinese Patent Application No. 201480033918.4 (with English language translation of Search Report).
Taiwanese Office Action dated Oct. 24, 2017 in Patent Application No. 103120491 (with English Translation of Search Report).
Office Action dated Oct. 10, 2017 in Japanese Patent Application No. 2015-522868.
International Search Report dated Aug. 26, 2014 in PCT/JP2014/065652, filed Jun. 12, 2014 (with English Translation).
Georgina Izquierdo et al. "Phase Equilibria in the System $Li_2$—$TiO_2$", Mat. Res. Bull. vol. 15, 1980, 6 pages.
International Preliminary Report on Patentability and Written Opinion dated Dec. 23, 2015 in PCT/JP2014/065652 filed Jun. 12, 2014 (submitting English translation only).
Liang Cheng, et al., "Carbon-Coated $Li_4Ti_5O_{12}$ as a High Rate Electrode Material for Li-Ion Intercalation", Journal of the Electrochemical Society, vol. 154, No. 7, 2007, pp. A692-A697.
Shahua Huang, et al., "$Li_4Ti_5O_{12}$/Ag composite as electrode materials for lithium-ion battery", Solid State Ionics, vol. 177. 2006, pp. 851-855.

* cited by examiner

1 μm 20 nm

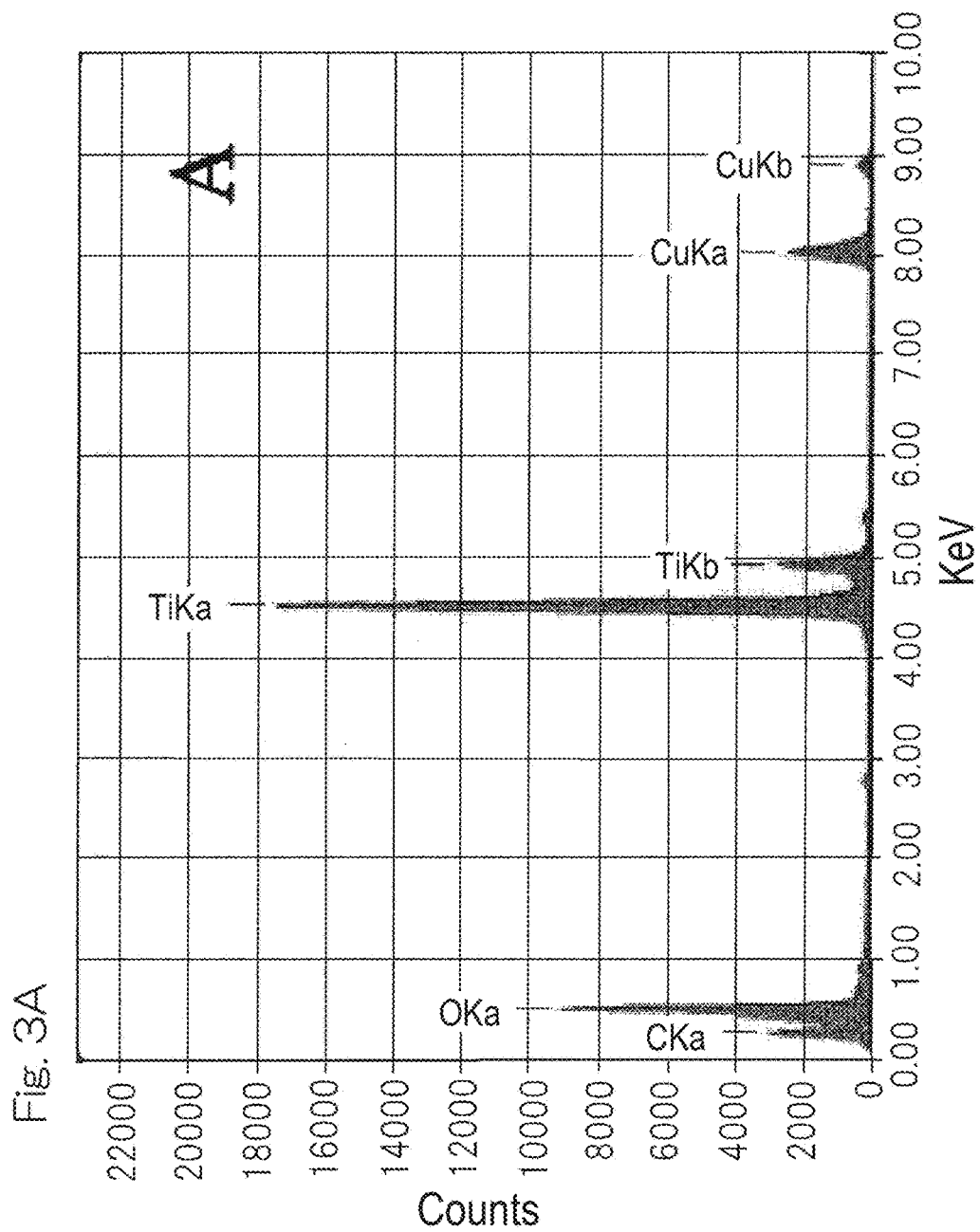

200 nm 20 nm 200 nm 20 nm

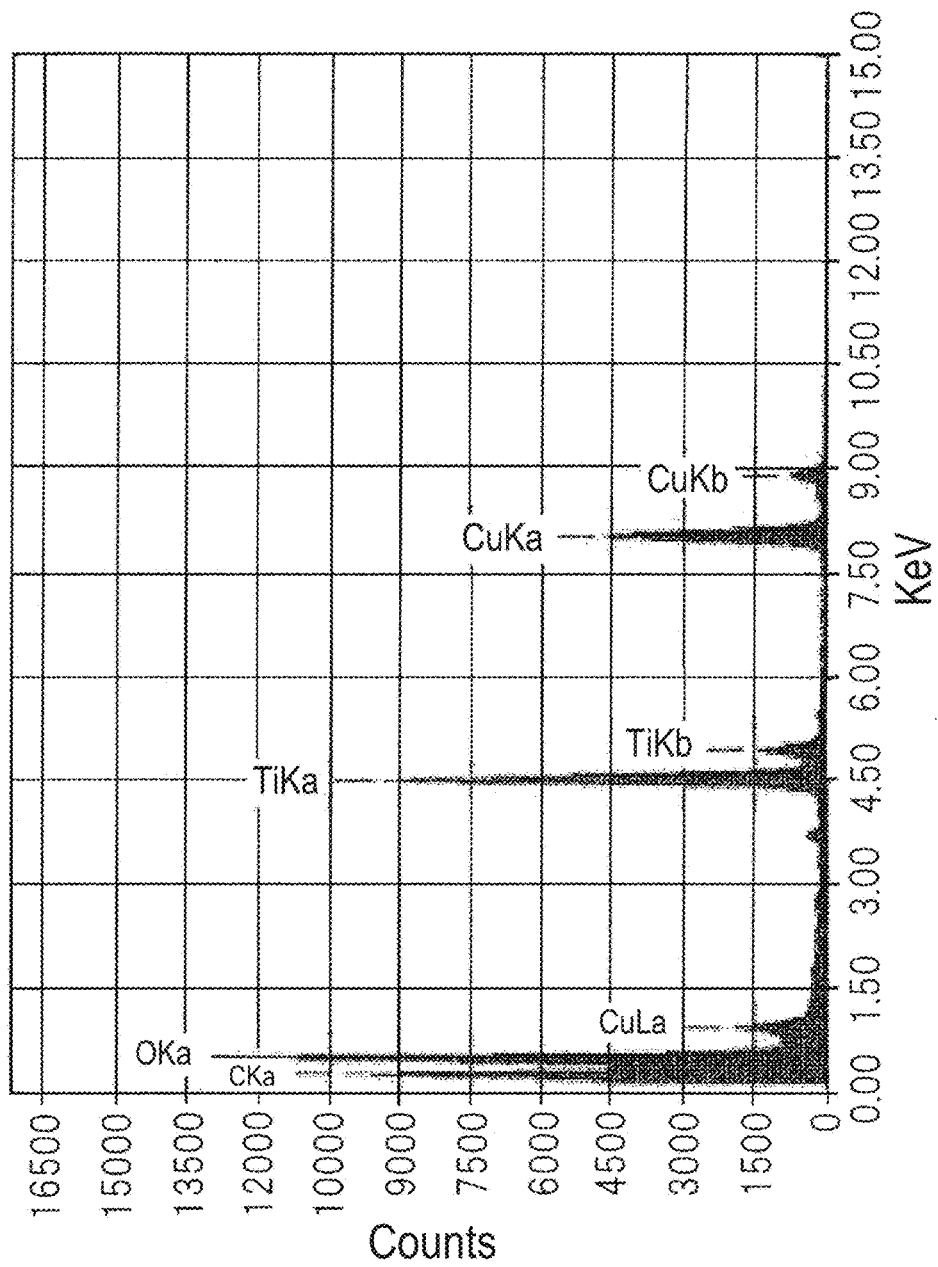

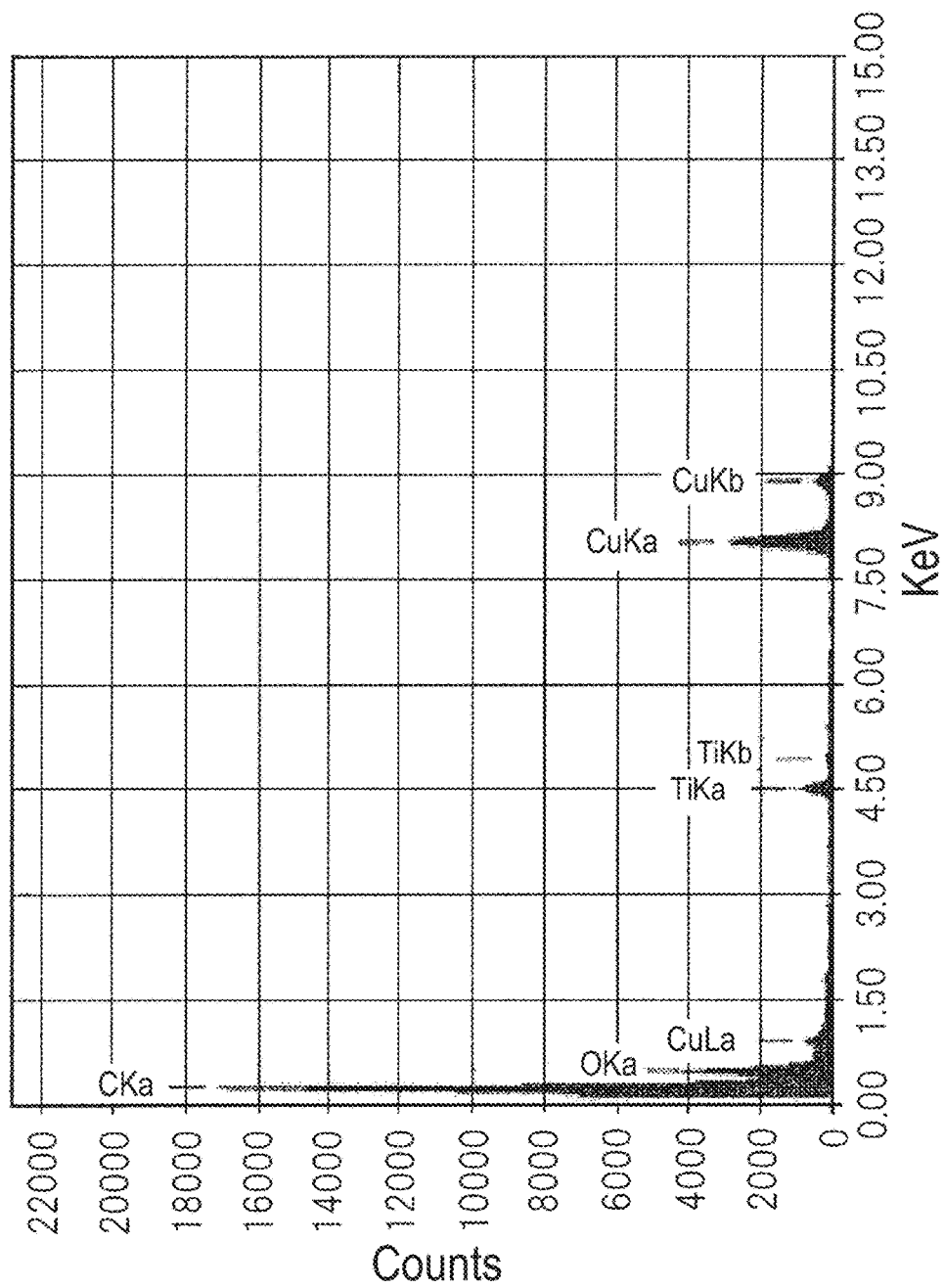

NON-STOICHIOMETRIC TITANIUM COMPOUND-CARBON COMPOSITE, METHOD FOR PRODUCING SAME, NEGATIVE ELECTRODE ACTIVE MATERIAL AND LITHIUM ION SECONDARY BATTERY

CROSS REFERENCE TO THE RELATED APPLICATION

This application is a continuation application, under 35 U.S.C. § 111(a), of international application No. PCT/JP2014/065652, filed on Jun. 12, 2014, which claims priority to Japanese Patent Application No. 2013-125293 filed on Jun. 14, 2013, the entire disclosure of which is herein incorporated by reference as a part of this application.

FIELD OF THE INVENTION

The present invention relates to a composite material containing non-stoichiometric titanium compound and carbon, a method for producing the same, and also relates to a negative electrode active material containing the same composite material of carbon and non-stoichiometric titanium compound, and a lithium ion secondary battery utilizing the same material.

BACKGROUND ART

Currently, lithium ion secondary batteries have been widely used mainly in electronic devices such as portable devices, since the lithium ion secondary batteries have higher electric voltage, larger charge-discharge capacity, and more resistive to adverse effects due to memory effect or the like, compared to nickel-cadmium batteries.

On the other hand, lithium ion secondary batteries have excellent energy densities and output densities, and are used as batteries of hybrid vehicles and electric vehicles as well as batteries of various portable electric devices such as laptops and mobile phones. In addition, lithium ion secondary batteries are expected to be applied in electric cars and electric power storage unit in future. However, there is a room for improvement of safety and high temperature resistance for lithium ion secondary batteries.

Recently, attention has been paid to non-combustible metallic oxide $Li_4Ti_5O_{12}$ as a novel negative electrode active material that can replace carbon negative electrode so as to improve safety and high temperature resistance of lithium ion secondary batteries. Metallic lithium does not precipitate during insertion and extraction reaction of lithium ions in the $Li_4Ti_5O_{12}$ since the insertion voltage of lithium ion shows high and flat value around 1.55V vs Li/Li$^+$. Therefore, solid electrolyte interface (SEI) having inferior thermal stability does not tend to be formed on the surface of the electrode. Further, since the change of volume is minimal during the insertion and extraction reaction of lithium ions, $Li_4Ti_5O_{12}$ exhibits quite satisfactory cycle properties. Therefore, the use of $Li_4Ti_5O_{12}$ in the negative electrode allows designing a battery having higher safety than a battery including a negative electrode constituted of a carbon material.

However, it is difficult to synthesize a single phase product composed only of $Li_4Ti_5O_{12}$. During its synthesis, $Li_4Ti_5O_{12}$ is obtained as a mixture with $Li_2TiO_3$ and rutile type $TiO_2$ (hereafter referred to as "r-$TiO_2$") that participates in deterioration of battery property. It is generally known that synthetic conditions for $Li_4Ti_5O_{12}$ having a specific stoichiometric composition is restricted to very narrow ranges, and $Li_4Ti_5O_{12}$ is obtained as a mixture mixed with r-$TiO_2$ or $Li_2TiO_3$ depending on the proportions of lithium and titanium (Non-Patent Document 1: G. Izquierdo and A. R. West. "Phase Equilibria in the System $Li_2O$—$TiO_2$." *Mat. Res. Bull.*, vol. 15, pp. 1655-1660. (1980)). $Li_4Ti_5O_{12}$ exists in a mixture with these compounds in previously reported articles and commercial products. In addition, since electron conductivity of $Li_4Ti_5O_{12}$ is as low as $10^{-13}$ Scm$^{-1}$, the use of $Li_4Ti_5O_{12}$ as a negative electrode material has included a problem of reduction of electrical capacity in the time of discharge with large electric current.

In order to solve the above-described problem, techniques have been proposed to improve battery properties, for example, by combining $Li_4Ti_5O_{12}$ with carbon (Non-Patent Document 2: L. Cheng, X. L. Li, H. J. Liu, H. M. Xiong, P. W. Zhang, Y. Y. Xia. "Carbon-Coated $Li_4Ti_5O_{12}$ as a High Rate Electrode Material for Li-Ion Intercalation." *J. Electrochem. Soc.*, vol. 154, pp. A692-A697. (2007)) or silver (Non-Patent document 3: S. Huang, Z. Wen, J. Zhang, Z. Gu, X. Xu. "$Li_4Ti_5O_{12}$/Ag Composite as Electrode Materials for Litium-Ion Battery." *Solid State Ionics*, vol. 177, pp. 851-855. (2006)).

Publication of International Application WO2010/052950 describes a technique including: adding predetermined amounts of dicarboxylic acid having carbon number of 4 or more, lithium salt, and titanium alkoxide under the presence of water; stirring and dissolving the compounds to obtain a solution; spraying and drying the solution by spray-dry method to obtain a precursor material; firing the precursor material for a predetermined time period at a temperature of 700 to 900° C.; and thereby producing a composite of carbon and non-stoichiometric titanium compound shown by chemical formula of $Li_{4+x}Ti_{5-x}O_{12}$, where x is in the range of 0<x<0.3. WO2010/052950 describes that the non-stoichiometric titanium compound produced by the above-described method has excellent crystallinity and does not include impurity materials such as r-$TiO_2$ and $Li_2TiO_3$, and that the use of negative electrode active material constituted of a carbon-containing composite including this non-stoichiometric titanium compound can improve charge discharge property of a lithium ion secondary battery.

DISCLOSURE OF THE INVENTION

In general, synthesis of $Li_4Ti_5O_{12}$ has been performed by solid phase reaction method. This method includes a problem of tendency to form impurity phase such as r-$TiO_2$ and $Li_2TiO_3$ by inhomogeneous reaction of starting materials and/or by loss of lithium due to long time firing. Further, solid phase reaction method tends to result in synthesis of particles having large diameter and wide range distribution of particle diameter. The above described problems and quite low electric conductivity of $Li_4Ti_5O_{12}$ itself have had large influence on the charge-discharge properties, especially on the reduction of battery property at high rate.

Although the technologies disclosed in Non-Patent Documents 1 to 3 provide materials of high electric conductivity, lithium ion secondary batteries obtained using these materials do not show satisfactory properties in charge-discharge properties.

According to WO2010/052950, high charge-discharge property is shown where the negative electrode active material is constituted of a composite of non-stoichiometric titanium compound and carbon, where a carboxylic acid having a carbon number of 4 or more is used as a source of the carbon. However, WO2010/052950 does not discloses a structure (texture) where carbon is uniformly distributed over the surface of the non-stoichiometric titanium compound, and the non-stoichiometric titanium compound showed large variation of surface electron conductivity between the individual particles. WO2010/052950 describes production of the composite of non-stoichiometric titanium compound and carbon by firing of the precursor material, but fails to show a method for suppressing coarsening of particles due to aggregation during the firing.

In order to provide lithium ion secondary batteries with a stable quality, it is preferable to suppress coarsening of the particles of non-stoichiometric titanium compound used as the negative electrode active material such that the particles have excellent dispersibility. In addition, it is preferable that the electron conductivity on the surfaces of the particles shows small variability and that move of lithium ions between the non-stoichiometric titanium compound and electrolyte is not disturbed.

An objective of the present invention is to provide a composite of non-stoichiometric titanium compound and carbon that can increase charge discharge capacity of lithium ion secondary batteries, a negative electrode active material for lithium ion secondary batteries and a lithium ion secondary battery utilizing the composite.

Further objective of the present invention is to provide a composite material of non-stoichiometric titanium compound and carbon that have particles with suppressed coarsening and uniform surface properties and that can increase charge-discharge capacity of lithium ion secondary batteries, a negative electrode active material for lithium ion secondary batteries and a lithium ion secondary battery utilizing the composite material.

Another objective of the present invention is to provide a method for producing the composite material of non-stoichiometric titanium compound and carbon efficiently.

As a result of extensive investigation to achieve the above-described objectives, the inventors found that use of a hydrophilic polymer as a carbon source during the production of carbon composite of non-stoichiometric titanium compound resulted in formation of a mixed layer (mixed phase layer) containing titanium and carbon in a specific proportion on the surface of the carbon composite particle, and that satisfactory battery property could be exerted by the use of this carbon-containing composite of non-stoichiometric titanium compound in an electrode possibly due to the presence of the mixed layer. Based on these findings, the inventors accomplished the present invention.

A first aspect of the present invention is a composite material of carbon-containing material and non-stoichiometric titanium compound (hereafter, referred to as non-stoichiometric titanium compound-carbon composite material) shown by the chemical formula of $Li_{4+x}Ti_{5-x}O_{12}$, where x is in the range of $0<x<0.30$, including:

at least one composite particle (unit particle of composite material) including a core portion composed of the non-stoichiometric titanium compound, and a mixed layer (outer layer) formed on the surface of the core portion, the mixed layer including the non-stoichiometric titanium compound and carbon, wherein atomic ratio of titanium and carbon in the mixed layer satisfies Ti/C=1/50 or more.

Preferably, the mixed layer may be present over the entire surface of the particle of the composite material. Preferably, the mixed layer is formed to have a thickness of 100 nm or less.

Preferably, in the above-described non-stoichiometric titanium compound-carbon composite material, atomic ratio Ti/C of titanium and carbon in the mixed layer is 1/2 or less.

The above-described non-stoichiometric titanium compound-carbon composite material may have a specific surface area determined by BET method of 20 to 100 $m^2g^{-1}$. Average diameter of the composite material particles constituting the non-stoichiometric titanium compound-carbon composite material may be 20 µm or less.

A second aspect of the present invention is a method for producing a non-stoichiometric titanium compound-carbon composite material shown by a chemical formula of $Li_{4+x}Ti_{5-x}O_{12}$, where x is in a range of $0<x<0.30$, at least including:

performing dissolution of predetermined amounts of a hydrophilic polymer, a lithium salt, and a titanium alkoxide in an aqueous solvent by adding these components in the aqueous solvent and dissolving the components while dispersing the components by agitation;

performing formation of a precursor material by spray drying a solution prepared by the dissolution; and performing firing of the precursor material in a furnace at a temperature of not lower than 600° C. and not higher than 900° C. for a predetermined time under a reduced atmosphere or an inert atmosphere.

The above-described method may further comprise performing preliminary firing of the precursor material obtained by spray-drying the solution before the firing (main firing), the preliminary firing being performed at a temperature of not lower than 300° C. and lower than 600° C. for a predetermined time under a reduced atmosphere or an inert atmosphere.

In the above-described method, a polyvinyl alcohol may be used as a hydrophilic polymer.

A third aspect of the present invention is a negative electrode active material including the non-stoichiometric titanium compound-carbon composite material.

A fourth aspect of the present invention is a lithium ion secondary battery including a positive electrode, a negative electrode, a separator disposed between the positive electrode and the negative electrode, and an electrolyte, wherein the negative electrode includes the above-described negative electrode active material.

The present invention also encompasses any combination of at least two constituent elements disclosed in claims and/or description and/or drawings. For examples, the present invention encompasses any combination of two or more elements described in claims.

According to the non-stoichiometric titanium compound-carbon composite material of the present invention, a mixed layer containing titanium and carbon in a predetermined atomic ratio exists on the surface of the non-stoichiometric titanium compound. Therefore, where the non-stoichiometric titanium-carbon composite material is used as a negative electrode active material to obtain a lithium ion secondary battery, it is possible to improve charge-discharge property of the lithium ion secondary battery.

According to the non-stoichiometric titanium compound-carbon composite material of the present invention, since a mixed layer containing non-stoichiometric titanium compound and carbon is formed on the surface of a core particle of non-stoichiometric titanium compound, it is possible to suppress coarsening of the non-stoichiometric titanium compound particles by aggregation during the firing.

According to the method for producing a non-stoichiometric titanium compound-carbon composite material of the present invention, it is possible to produce the above-described non-stoichiometric titanium compound-carbon composite material efficiently.

BRIEF DESCRIPTION OF DRAWINGS

The present invention will be understood clearly based on the below described explanation of preferred embodiments with reference to the attached drawings. However, it should be noted that the embodiments and drawings are merely illustrative and explanatory examples, and are not limiting the scope of the invention. The scope of the invention is determined by the attached claims. In the attached drawings, same elements in different drawings are shown by the same symbols.

FIG. 3A is a graph showing a result of TEM-EDX analysis of a core portion of the constituent particle of non-stoichiometric titanium compound-carbon composite material A-1 according to Example 1.

FIG. 6A is a graph showing a result of TEM-EDX analysis of a core portion of the constituent particle of non-stoichiometric titanium compound-carbon composite material A-4 according to Comparative Example 2.

FIG. 6B is a graph showing a result of TEM-EDX analysis of a surface portion of the constituent particle of non-stoichiometric titanium compound-carbon composite material A-4 according to Comparative Example 2.

DESCRIPTION OF EMBODIMENTS

Non-Stoichiometric Titanium Compound-Carbon Composite Material

Figure 1:
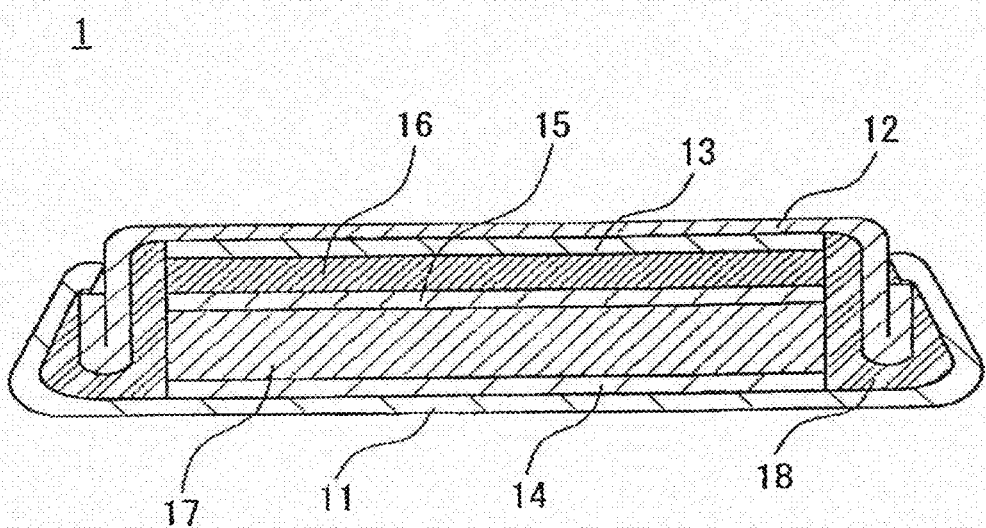
FIG. 1 is a schematic cross sectional view of a lithium ion secondary battery according to an embodiment of the present invention.

The non-stoichiometric titanium compound-carbon composite material according to the present invention is a composite material of non-stoichiometric titanium compound shown by the chemical formula of $Li_{4+x}Ti_{5-x}O_{12}$ (where x is in the range of 0<x<0.30) and a carbon-containing material. The carbon-containing material may be a material substantially consisting of carbon. Alternatively, the carbon-containing material may contain carbon and a compound of carbon and other element(s).

The non-stoichiometric titanium compound-carbon composite material includes composite particles (composite unit particles) each having a core portion and a mixed layer (hybrid layer) formed on the core portion of the particle, where the core portion includes non-stoichiometric titanium compound and the mixed layer includes non-stoichiometric titanium compound and carbon. The non-stoichiometric titanium compound-carbon composite material may be composed of unit particles of the composite particles, or may include aggregates of a plurality of composite particles.

The composite particles of the non-stoichiometric titanium compound-carbon composite material are mainly composed of non-stoichiometric titanium compound that constitutes core portions (core particles) of the particles. Here, the non-stoichiometric titanium compound is an oxide that contains Li and Ti in a non-stoichiometric composition and has a composition shown by the chemical formula of $Li_{4+x}Ti_{5-x}O_{12}$, where x is in the range of 0<x<0.30.

The mixed layer contains non-stoichiometric titanium compound and carbon.

Ratio of numbers of atoms (atomic ratio) of titanium and carbon in the mixed layer is in the range shown by Ti/C is not lower than 1/50. Even though the precise mechanism is unknown, it is estimated that efficient charge and discharge are realized due to reduction of resistance to insertion (charge) and extraction (discharge) of lithium ions in the non-stoichiometric titanium compound, where the atomic ratio of titanium and carbon in the mixed layer satisfies Ti/C=1/50 or more.

Atomic ratio of titanium and carbon in the mixed layer preferably satisfies Ti/C=1/2 or less. Where the atomic ratio Ti/C is larger than 1/2, conduction of ions or electrons in a carbon-containing film (mixed layer) is disturbed, occasionally resulting in failure to achieve desired electrical properties due to reduction of electrical conductivity.

More preferably, Ti/C is approximately in the range of 1/30 to 1/4.

Preferably, the mixed layer is formed over the entire surface of the composite particle. Where the mixed layer exist over the entire surface of the particle, preferably substantially without a defective part, it is possible to protect the interior portion of the composite by the mixed layer, thereby improving stability of the composite material. Specifically, coarsening due to aggregation of non-stoichiometric titanium compound particles is suppressed.

The presence or absence of the mixed layer can be confirmed by observation of the non-stoichiometric titanium compound-carbon composite material using a transmission electron microscope (TEM) and analysis by energy dispersive x-ray analyzer (EDX analysis).

Preferably, the mixed layer is formed over the entire surface of the composite particle substantially uniformly. Here, "substantially uniform" denotes a state in that a variation of thickness of the mixed layer is within ±20% of the average thickness.

Preferably, the thickness of the mixed layer may be 100 nm or less in order to improve charge-discharge capacity of a lithium ion secondary battery that includes the non-stoichiometric titanium compound-carbon composite material as negative electrode active material. Preferably, the thickness of the mixed layer is 1 nm or more.

The thickness of the mixed layer can be measured by observation of the composite particle using a transmission electron microscope.

For example, average particle diameter of the composite particles constituting the non-stoichiometric titanium compound-carbon composite material may be 20 μm or less, preferably 10 μm or less, more preferably 5 μm or less. As described in the Examples, the average particle diameter in this description may be a value obtained by calculation of average value of maximum diameters of a plurality of particles randomly sampled in the observation using a transmission electron microscope.

A specific surface area of the non-stoichiometric titanium compound-carbon composite may be, for example, 20 to 100 $M^2g^{-1}$ in the specific surface area measured by BET method. The specific surface area may be 30 to 50 $m^2g^{-1}$. The method described in the Examples may be used in the measurement of the specific surface area according to the BET method.

Method for Producing Non-Stoichiometric Titanium Compound-Carbon Composite Material The non-stoichiometric titanium compound-carbon composite material may be produced in the below-described production method.

The method for producing a non-stoichiometric titanium compound-carbon composite material according to the present invention at least includes:

performing dissolution of predetermined amounts of a hydrophilic polymer, a lithium salt, and a titanium alkoxide in an aqueous solvent by adding these components in the aqueous solvent and dissolving the components while dispersing the components by agitation;

performing formation of a precursor material by spray-drying a solution obtained by the dissolution; and performing firing of the precursor material under a reduced atmosphere or an inert atmosphere at a temperature of 600 to 900° C. for a predetermined period of time.

Although blending ratio of the hydrophilic polymer, the lithium salt, and the titanium alkoxide is not specifically limited, preferably, 1 to 50 parts by mass of lithium salt and 1 to 30 parts by mass of hydrophilic polymer are blended with 100 parts by mass of titanium alkoxide.

In the above-described production method, by forming the precursor material by spray-drying of the solution, and subsequently firing the precursor material under appropriate conditions, it is possible to obtain a composite material of non-stoichiometric titanium compound and carbon that has titanium-carbon mixed layer on the surface of a core portion, where the core portion that constitutes inner part of the composite particle includes the non-stoichiometric titanium compound composed of a single phase that has high crystallinity in contrast to non-stoichiometric titanium compound of an amorphous film obtained by sputtering method.

Dissolution Process

In the dissolution, a solution used in formation of the precursor material is prepared by adding predetermined amounts of a hydrophilic polymer, a lithium salt, and a titanium alkoxide in an aqueous solvent, and dissolving these components in the solvent while dispersing the solvents by agitation. The dissolution may be performed by preparing a first solution dissolving the lithium salt and the titanium alkoxide, a second solution dissolving the hydrophilic polymer, and subsequently mixing the first solution and the second solution.

The aqueous solvent is not particularly limited provided that the solvent can be dissolved in water. For example, alcohols, ethers, ketones, various organic acids, inorganic acids, and aprotic polar solvents (e.g., DMSO) or the like may be used. It is preferable to use water as the aqueous solvent from the viewpoint of handleability.

Lithium carbonate, lithium hydroxide or the like may be used as the lithium salt, where lithium carbonate is preferred.

Titanium tetramethoxide, titanium tetraethoxide, titanium tetraisopropoxide, titanium dioxide or the like may be used as the titanium alkoxide, where the titanium tetraisopropoxide is preferred.

Composition of the non-stoichiometric titanium compound may be adjusted by controlling the Li/Ti ratio of the lithium salt and the titanium alkoxide to a designated ratio. WO2010/052950 has reported that a non-stoichiometric titanium compound composed of a single phase having excellent crystallinity can be obtained by spray-drying an aqueous solution containing a lithium salt and a titanium alkoxide and firing the dried material under predetermined conditions.

The important point in the present invention is the use of a hydrophilic polymer as a source of carbon. By the use of the hydrophilic polymer, it is possible to improve stability of the composite material and to realize uniformizable coverage with the titanium-carbon mixed layer in the achieved carbon-containing composite of non-stoichiometric titanium compound. Possibly due to this property, the lithium ion secondary battery utilizing the composite as a negative electrode active material exhibits high capacity stably. The composite material including non-stoichiometric titanium compound particles the surfaces of which are covered with the mixed layer containing the non-stoichiometric titanium compound and carbon is not reported in WO2010/052950.

Various polymers having a hydrophilic group such as a hydroxyl group (—OH), a carboxyl group (—COOH), and an amino group (—$NH_2$) may be used as the hydrophilic polymer, where molecular weight of the polymer may be, for example, generally 1000 or more in viscosity average molecular weight.

For example, a polyvinyl alcohol, a polyacrylic acid and a salt thereof, a polyamide, a polyacrylamide, a cellulose derivative, a polyalkylene oxide, a gelatin, a starch, or the like may be used as the hydrophilic polymer.

Among the above-described polymers, it is preferable to use water-soluble polymers. For example, a carboxymethyl cellulose, a methylcellulose, an ethyl cellulose, a polyvinyl alcohol, a polyacrylic acid and a salt thereof, a polyacrylamide, a polyethylene oxide, or the like are preferred.

Specifically, it is preferable to use a polyvinyl alcohol based on the viewpoint of handleability.

Viscosity average polymerization degree of the above-described polyvinyl alcohol is measured in accordance with JIS K6726. Degree of polymerization of PVA in the present invention may be 200 to 5000. Where the viscosity average polymerization degree is too small, it is difficult to form a layer on the surface of the non-stoichiometric titanium compound uniformly. On the other hand, where the viscosity average polymerization degree is too large, it is difficult to form a layer on the surface of the non-stoichiometric titanium compound uniformly due to deteriorated handleability caused by too high viscosity of the aqueous solution. Preferably, viscosity average polymerization degree is 300 to 4500, more preferably 500 to 3500.

Degree of saponification of the polyvinyl alcohol used in the present invention is measured in accordance with JIS K6726. The polyvinyl alcohol may have a degree of saponification of 50 to 99.99 mol %. Where the degree of saponification is too small, water solubility of the polyvinyl alcohol is degraded remarkably, resulting in inferior operability. On the other hand, where the degree of saponification is too high, it is impossible to produce a PVA stably. Preferably, the degree of saponification is 60 to 99.8 mol %, and more preferably 70 to 96.50 mol %.

Where necessary, the polyvinyl alcohol used in the present invention may be formed with other modification unit (copolymerizable monomer). For example, such copolymerizable monomer may be selected from alpha-olefins such as ethylene, propylene, 1-butene, isobutene, and 1-hexene;

carboxylic acids or derivatives thereof such as fumaric acid, maleic acid, itaconic acid, maleic anhydride, and itaconic anhydride; acrylic acid or a salt or an ester thereof; methacrylic acid or a salt or an ester thereof; acrylamide or acrylamide derivatives such as acrylamide, N-methyl acrylamide and N-ethyl acrylamide; methacrylamide or methacrylamide derivatives such as methacrylamide, N-methyl methacrylamide and N-ethyl methacrylamide; vinyl ethers such as methyl vinyl ether, ethyl vinyl ether, n-propyl vinyl ether, isopropyl vinyl ether, and n-butyl vinyl ether; hydroxyl group-containing vinyl ethers such as ethylene glycol vinyl ether, 1,3-propanediol vinyl ether, and 1,4-butanediol vinyl ether; allyl ethers such as allyl acetate, propyl allyl ether, butyl allyl ether, and hexyl allyl ether; monomers having an oxyalkylene group; hydroxyl group-containing alpha olefins such as isopropenyl acetate, 3-buten-1-ol, 4-penten-1-ol, 5-hexen-1-ol, 7-octen-1-ol, 9-decen-1-ol, and 3-methyl-3-buten-1-ol; sulfonic acid group-containing monomers such as ethylene sulfonic acid, allyl sulfonic acid, methallyl sulfonic acid, and 2-acrylamide-2-methylpropane sulfonic acid; cation group-containing monomers such as vinyloxyethyltrimethyl ammonium chloride, vinyloxybutyltrimethyl ammonium chloride, vinyloxyethyldimethylamine, vinyloxymethyldiethylamine, N-acrylamide methyltrimethylammonium chloride, N-acrylamide ethyltrimethylammonium chloride, N-acrylamide dimethylamine, allyltrimethylammonium chloride, methallyltrimethylammonium chloride, dimethyl allyl amine, and allyl ethyl amine; and silyl group-containing momomers such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide-propyltrimethoxysilane, and 3-(meth)acrylamide-propyltriethoxysilane; and others. It is possible to use single one selected from these copolymerizable monomers. Alternatively, these copolymerizable monomers may be used in combination. Introduction of copolymerizable monomer may be performed through copolymerization or through subsequent reaction.

A proportion of the modification unit (denaturation unit) to the vinyl alcohol unit may be varied depending on the purpose of use and application. In general, based on the proportion over all the monomers used in copolymerization, a proportion of the modification unit is 20 mol % or less, preferably 10 mol % or less.

Formation of Precursor Material

In the formation of precursor material, the precursor material is formed by spray-drying a solution obtained by the dissolution. The way of spray-drying may be selected based on the desired form of the precursor material. Preferably, the solution is spray-dried using a spray-drier.

For example, the spray-drying conditions may be controlled to inlet temperature of about 100 to 200° C., outlet temperature of about 60 to 150° C., spray pressure of about 50 to 150 kPa, heat air flow rate of about 0.5 to 1.3 m³/min, and solution flow rate of about 100 to 800 mL/h.

Firing Process

In the firing, the precursor material obtained by the above-described formation of precursor material is fired at a temperature of not lower than 600° C. and not higher than 900° C. under a reduced atmosphere or an inert atmosphere for a predetermined period of time (for example, 6 to 48 hours).

At that time, the atmosphere is replaced by mixed gas of argon and hydrogen for treatment under the reduced atmosphere, or by nitrogen or argon for the treatment under the inert atmosphere.

Although the precursor material achieved by the spray-drying may be used as it is in the firing (main firing), it is preferable to perform preliminary firing by heating the precursor material at a temperature of not lower than 300° C. and lower than 600° C. under a reduced atmosphere or an inert atmosphere for a predetermined period of time (for example, 1 to 6 hours, preferably 2 to 5 hours). The preliminary firing can improve charge-discharge efficiency achieved by the obtained composite material.

After the firing (main firing or a combination of main firing and preliminary firing), it is possible to achieve a composite material of carbon-containing material and non-stoichiometric titanium compound shown by the chemical formula of $Li_{4+x}Ti_{5-x}O_{12}$, where x is in the range of $0<x<0.30$.

Lithium Ion Secondary Battery

A lithium ion secondary battery according to an embodiment of the present invention includes a positive electrode, a negative electrode, a separator disposed between the positive electrode and the negative electrode, and an electrolyte.

The positive electrode may at least include a positive electrode current collector and a positive electrode active material. The negative electrode may at least include a negative electrode current collector and a negative electrode active material.

Here, the lithium ion secondary battery of the present invention includes the above-described composite material of carbon-containing material and non-stoichiometric titanium compound shown by the chemical formula of $Li_{4+x}Ti_{5-x}O_{12}$, where $0<x<0.30$, as a negative electrode active material.

Where the above-described composite material is used as a negative electrode active material, reduction of voltage is relatively moderate and relatively larger charge-discharge capacity can be achieved compared to the case of using known negative electrode active material. Therefore, the non-stoichiometric titanium compound-carbon composite material of the present invention is satisfactorily applicable to the application such as lithium ion secondary batteries that requires to stably maintain high voltage for a long period of time and also requires high power, high charge-discharge capacity, and safety, and further also to the application that requires water resistance, acidic resistance, handleability, safety, and stability.

A lithium ion secondary battery utilizing the non-stoichiometric titanium compound-carbon composite material according to an embodiment of the present invention as a negative electrode active material is explained with reference to FIG. 1.

FIG. 1 shows a schematic cross-sectional view of a lithium ion secondary battery as a coin-type cell. Lithium ion secondary battery 1 includes a positive electrode can 11. The positive electrode can 11 is equipped with a gasket 18 and houses in its interior: a positive electrode comprising a positive electrode current collector layer 14, a positive electrode active material layer 17; a negative electrode comprising a negative electrode active material layer 16, a negative electrode current collector layer 13; and an electrolyte layer that comprises a separator 15 keeping electrolyte solution between the positive electrode and the negative electrode. The positive electrode can 11 is covered by a negative electrode terminal 12, and the periphery of the positive electrode can 11 and the negative electrode terminal 12 is sealed by swaging via the insulating gasket 18. The negative electrode active material layer 16 includes the above described non-stoichiometric titanium compound-carbon composite material.

It should be noted that a lithium ion secondary battery according to the present invention is not limited to the above-described form of battery. For example, the lithium ion secondary battery may utilize a solid film electrolyte, an electrolyte solution, a gelled electrolyte, a polymer electrolyte, or the like as the electrolyte.

Positive Electrode and Negative Electrode

Where necessary, each of the positive electrode and the negative electrode may include a binder, a conduction supporting agent, a solvent or the like.

For example, a polyvinylidene difluoride, a polyvinylidene fluoride, or a polyacrylic acid (PAA) may be used as the binder, where the polyvinylidene difluoride is specifically preferred.

Acetylene black, graphite or the like may be used as the conduction supporting agent, where acetylene black is preferred.

N-methyl-2-pyrrolidinone, N-ethyl-2-pyrrolidone, N-butyl-2-pyrrolidone, water or the like may be used as the solvent, where N-ethyl-2-pyrrolidinone is especially preferred.

The negative electrode current collector and the positive electrode current collector may be selected from aluminum foil, other metal foil such as a foil of copper, nickel, or stainless steel, a film of conductive polymer such as a polyaniline, a polypyrrole or the like, a carbon sheet, or a metal foil or carbon sheet coated or covered with the conductive polymer film.

The positive electrode active material may be selected from spinel type lithium manganese nickel oxide ($LiMn_{1.5}Ni_{0.5}O_4$), lithium cobalt oxide ($LiCoO_2$), lithium nickel oxide ($LiNiO_2$), lithium nickel cobalt manganese oxide ($LiNi_1/3Mn_1/3Co_1/3O_2$), and lithium iron phosphate ($LiFePO_4$). These materials may be used alone or in combination.

By constituting the positive electrode active material layer by these compounds in which desorption and absorption of lithium ions easily occur, it is possible to have a large number of ion separation and ion storage in the positive electrode active material layer. As a result, it is possible to further improve the charge discharge property of lithium ion secondary battery.

Ethylene carbonate, dimethyl carbonate, methyl ethyl carbonate, propylene carbonate, dimethoxy ethane or the like may be used as a solvent of the electrolyte solution.

$LiPF_6$, $LiBF_4$ or the like may be used as an electrolyte salt.

EXAMPLES

Examples will be explained below. Not departing from the scope of the present invention, the present invention is not limited to the below described Examples.

Evaluation of Specific Surface Area of Non-Stoichiometric Titanium Compound-Carbon Composite Material (BET Method)

Specific surface area of non-stoichiometric titanium compound-carbon composite material was determined using measurement of nitrogen absorption (Brunaur Emmett Teller method). High purity gas/vapor absorption device (BEL-SORP-mini manufactured by BEL JAPAN, INC.) was used for the measurement. After drying specimen at 80° C. for 12 hours under a reduced pressure, the specimen was further subjected to a pretreatment regulated by BELSOAP-mini.

The measurement was performed based on absorption of $N_2$ at absorption temperature of 77K.

Evaluation of Particle Diameter and Surface State of Composite Particles

Average particle diameters and state of particle surface of the composite particles constituting the non-stoichiometric titanium compound-carbon composite material were evaluated using a transmission electron microscope (TEM). As a pretreatment, powder particles (1 g) were dispersed in ethanol (100 mL) After ultrasonic treatment for 30 minutes at room temperature, the dispersion was dropped on a grid and was dried at room temperature. Thus specimens for TEM observation were prepared. JEM-2100F manufactured by JEOL Ltd. was used for the observation. TEM photographs were taken under conditions of acceleration voltage of 200 kV. Magnification was varied from 30000 to 100000 depending on the objects of observation.

Presence or absence of a mixed layer on the surface of the composite particle was observed in randomly selected composite particles. Further, where the composite particle had a mixed layer, it was also examined if the mixed layer existed over the entire surface of the particle.

Thickness of the mixed layer was determined as an average thickness calculated from thickness measured in five portions randomly selected from the mixed layer.

Average diameter of the composite particle was calculated as an average of the maximum widths measured in three particles randomly selected from the non-stoichiometric titanium compound-carbon composite particles.

Analysis of Ti:C Ratios in Surface Layers of Particles (TEM-EDX)

Ti:C ratios in surface layers of particles were measured by TEM-EDX analysis. The instrument used in the EDX analysis was JED-2300 manufactured by JEOL Ltd. At least 10 points in a surface layer were analyzed to calculate Ti:C ratio. During the EDX analysis, electron beam was radiated to 20 nm×20 nm area on the surface layer of the particle to collect EDX spectrum from which Ti:C ratio was calculated.

Ti:C ratio in the interior portion (core) of the particle was analyzed in the same manner as in the analysis of the surface layer except that the electron beam was radiated to the core portion of the composite particle and the Ti:C ratio was calculated from data of at least three points.

Preparation of Coin Type Cell for Evaluation of Charge-Discharge Property

As shown in FIG. 1, each of R2032 type coin cells was prepared as a lithium ion secondary battery 1 according to an embodiment of the present invention. An electrode was prepared in accordance with the following manner. A negative electrode active material obtained in an Example or an Comparative Example was mixed with a binder (polyvinylidene difluoride) and a conduction supporting agent (acetylene black) in a weight ratio of 88:6:6 (wt. %). N-methyl-2-pyrroridinone was added as a solvent to the mixture, and the mixture was kneaded to form a slurry state. The slurry was coated on the surface of an aluminum foil as a negative electrode current collector, and the coated foil was compressed at room temperature using a roll press machine.

Then, a lithium ion secondary battery was prepared, where a metallic lithium foil was used as a counter electrode; 1 moldm$^{-3}$ of $LiPF_6$ in the mixture of ethylene carbonate and dimethyl carbonate, i.e., $LiPF_6$/(ethylene carbonate+dimethyl carbonate) (mixing ratio: 30/70 vol %) was used as an electrolyte solution, Celgard (Registered Trademark) #2325 was used as a separator. Preparation of the lithium ion secondary battery was performed in a glovebox in which the air was replaced by argon.

Since the evaluation of charge-discharge property was performed using a half-cell with metal lithium, the negative electrode material according to the present invention constitute a positive electrode of the cell for evaluation. However, the material is referred to as a negative electrode material for convenience in this description.

Although the present Examples show an embodiment using electrolyte solution, it is possible to use other type of electrolyte. For example, ion conductive ceramics, ion conductive glass, ion crystalline inorganic solid electrolyte or the like may be used as the other type of electrolyte.

Evaluation of Charge Discharge Property

Charge-discharge property of each of coin type cells that had been prepared in accordance with the above-explained preparation of coin type cell for evaluation of charge-discharge property was evaluated by measurement of capacity at respective current densities of 0.1 C, 3 C, and 10 C (1 C=175 mA/g), under evaluation conditions of 1.2 to 3.0 V in electric voltage and a temperature of 25° C.

Example 1

Synthesis of Non-Stoichiometric Titanium Compound-Carbon Composite Material A-1

Synthesis of carbon-containing composite obtained by carbon compositing pretreatment of non-stoichiometric titanium compound $Li_{4+x}Ti_{5-x}O_{12}$ (where x is in the range of 0<x<0.30) and production of lithium ion secondary battery utilizing the composite as a negative electrode active material were performed in accordance with the following manner. Here the non-stoichiometric titanium compound-carbon composite material is described as "$Li_{4+x}Ti_{5-x}O_{12}/C$".

Figure 2A:
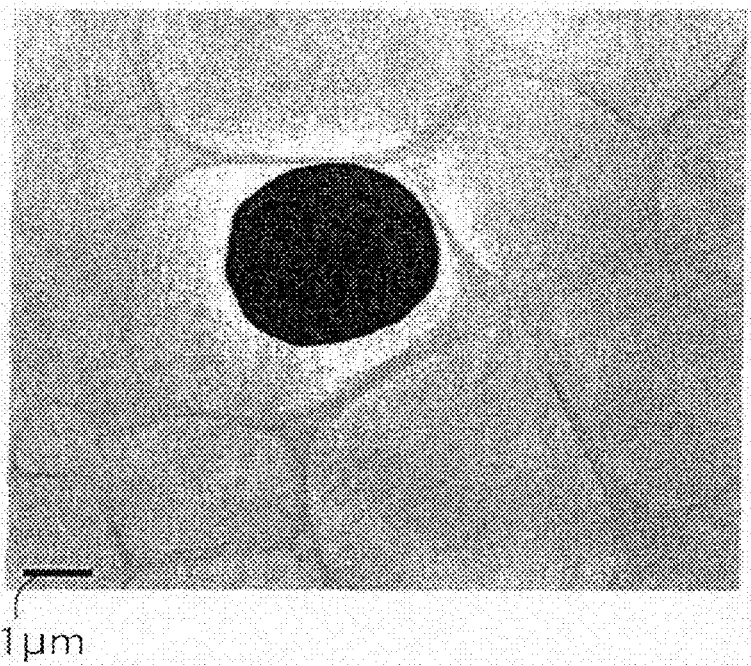
FIG. 2A is a TEM photograph of a constituent particle of non-stoichiometric titanium compound-carbon composite material A-1 according to Example 1.
Figure 2B:
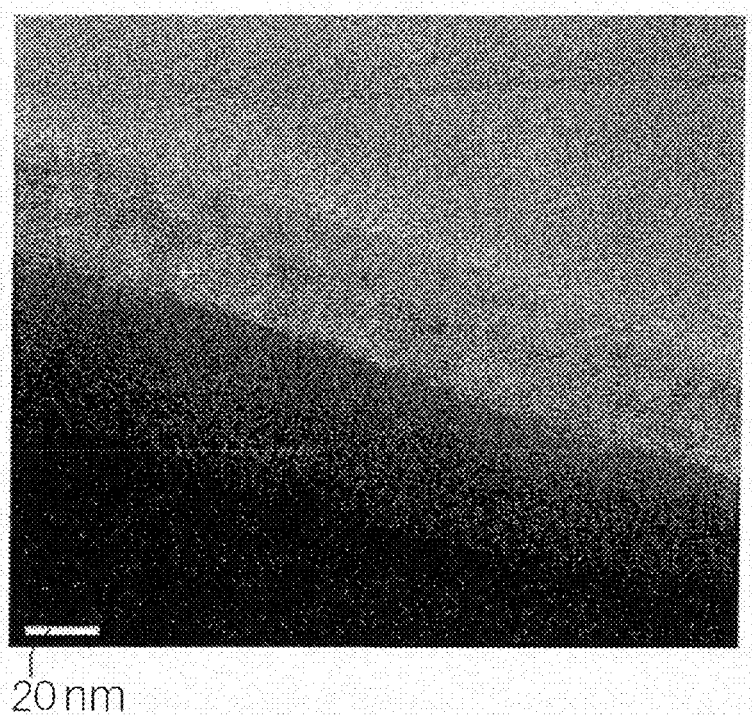
FIG. 2B is a TEM photograph that shows surface vicinity of the particle shown in FIG. 2A.
Figure 3B:
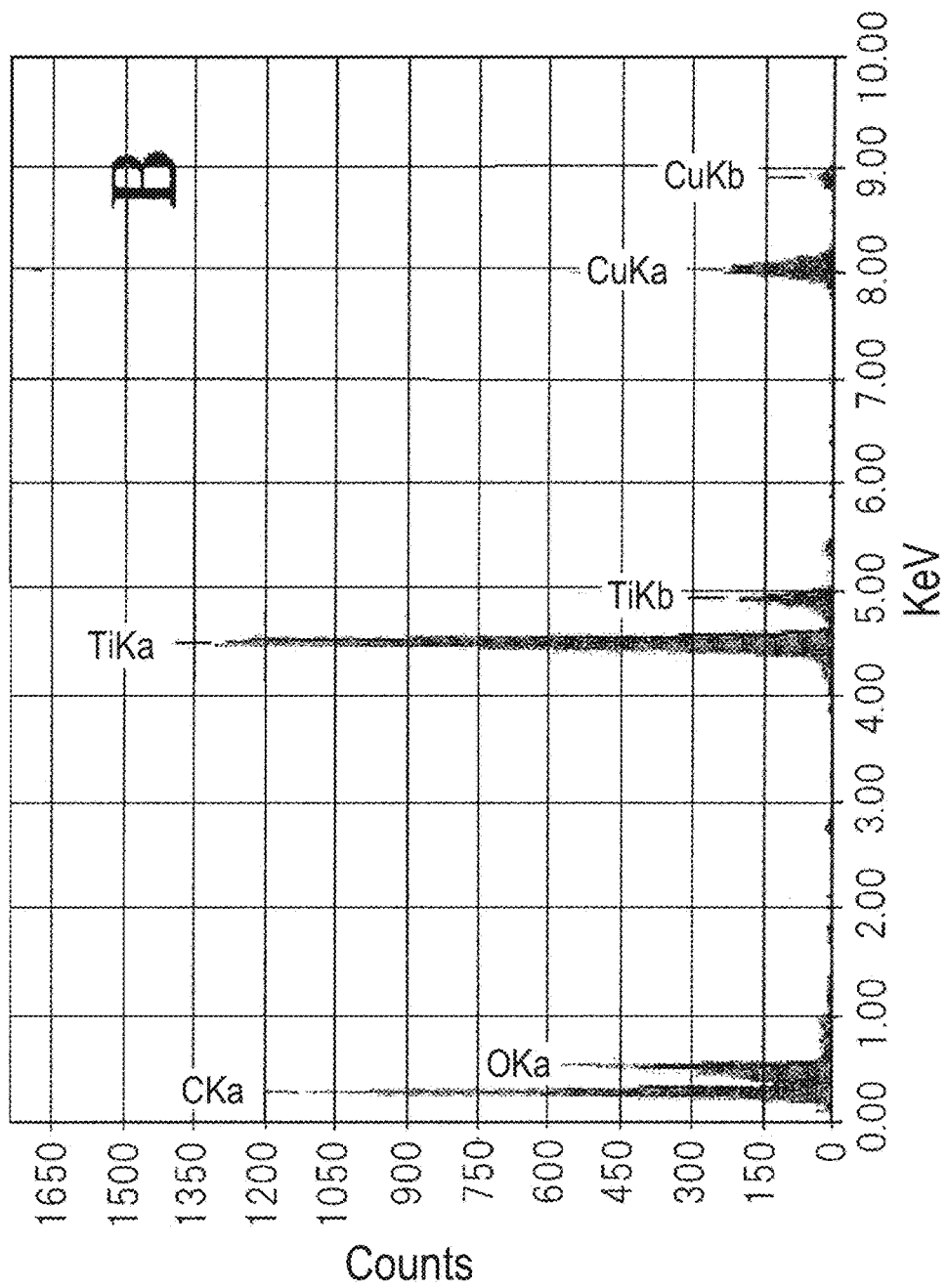
FIG. 3B is a graph showing a result of TEM-EDX analysis of a mixed layer that exists in the surface portion of the constituent particle of non-stoichiometric titanium compound-carbon composite material A-1 according to Example 1.

$Li_{4+x}Ti_{5-x}O_{12}/C$ (where x is in the range of 0<x<0.30) was synthesized in accordance with the following manner. Firstly, so as to obtain a non-stoichiometric titanium compound having the Li/Ti ratio of the above-described range, 3.18 g of lithium carbonate and 29.31 g of titanium tetraisopropoxide were added to distilled water (300 mL) to form a solution by agitation. By this blending ratio, non-stoichiometric titanium compound having a composition of ca. $Li_{4.2}Ti_{4.8}O_{12}$ is obtained. Further, 1.87 g of polyvinyl alcohol (PVA-1) having a viscosity average polymerization degree of 1700 and a saponification degree of 98.5 mol % was added to distilled water (100 mL), and a solution was obtained by agitating the water added with the polyvinyl alcohol. The latter PVA solution was added to the above-described solution, and a mixed solution was obtained by agitation. Next, a precursor material was obtained by spray-drying the obtained Li/Ti solution using a spray-dryer. The spray-drying was performed under the conditions of inlet temperature of 160° C., outlet temperature of 100° C., spray pressure of 100 kPa, hot air flow rate of 0.70 m³/min, and a solution flow rate of 400 mL/h. After preliminarily firing the obtained precursor material, the material was fired under inert atmosphere ($N_2$) at 800° C. for 12 hours in a muffle furnace, a non-stoichiometric titanium compound-carbon composite material A-1 expressed by $Li_{4+x}Ti_{5-x}O_{12}/C$ (where x is in the range of 0<x<0.30) was obtained. A TEM photograph of non-stoichiometric titanium compound-carbon composite particle constituting A-1 is shown in FIG. 2A, and a TEM photograph of a vicinity of the surface layer of the composite particle is shown in FIG. 2B. Examples of the results of TEM-EDX analysis used in measurement of compositions of the core of the particle and the mixed layer formed on the surface of the particles are shown in FIGS. 3A and 3B.

Specific surface area of the obtained carbon-containing composite of non-stoichiometric titanium compound $Li_{4+x}Ti_{5-x}O_{12}/C$ (where x is in the range of 0<x<0.30), average particle diameter of the composite particle, and a surface state of the particle (coverage state and Ti:C ratio) are shown in Table 1.

Example 2

Synthesis of A-2 and Battery Utilizing Same

Carbon-containing composite of non-stoichiometric titanium compound A-2 was prepared under the same conditions as in Example 1 except that 1.87 g of polyvinyl alcohol (PVA-2) having a viscosity average polymerization degree of 1700 and a saponification degree of 88.5 mol % was used as an alternative to PVA-1 used in the above-described Example 1.

Specific surface area of thus-obtained non-stoichiometric titanium compound-carbon composite material A-2, average particle diameter of composite particle, and surface state (coverage state and Ti:C ratio) of the particles are shown in Table 1.

The obtained carbon-containing composite of non-stoichiometric titanium compound was used as negative electrode active material to evaluate charge discharge property. The results are shown in Table 1.

Comparative Example 1

Synthesis of A-3 and Battery Utilizing Same

Figure 4A:
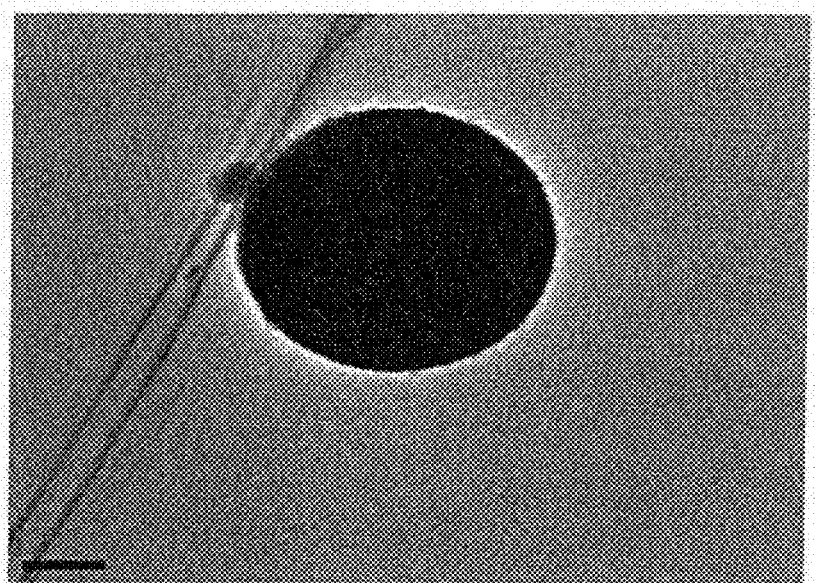
FIG. 4A is a TEM photograph of a constituent particle of non-stoichiometric titanium compound A-3 of Comparative Example 1.
Figure 4B:
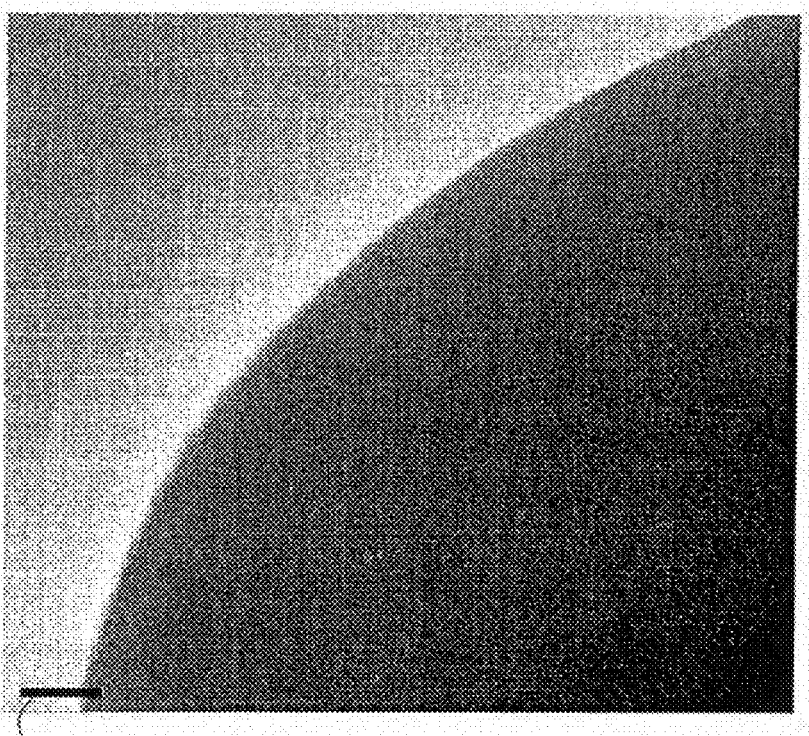
FIG. 4B is a TEM photograph that shows surface vicinity of the particle shown in FIG. 4A.

Non-stoichiometric titanium compound A-3 was prepared in the same manner as in the above-described Example 1 except that PVA-1 was not added. A TEM photograph of a particle constituting A-3 is shown in FIG. 4A, and a TEM photograph of a vicinity of a surface layer of the particle is shown in FIG. 4B.

Specific surface area of the obtained non-stoichiometric titanium compound A-3, average particle diameter of the non-stoichiometric titanium compound particles, and surface state of the particle are shown in Table 1.

The obtained non-stoichiometric titanium compound A-3 was used as negative electrode active material to evaluate charge discharge property. The results are shown in Table 1.

Comparative Example 2

Synthesis of A-4 and Battery Utilizing Same

Carbon-containing composite of non-stoichiometric titanium compound A-4 was prepared under the same conditions as in Example 1 except that 2.43 g of sucrose (Special grade, manufactured by Wako Pure Chemical Industries, Ltd.) was used as an alternative to PVA-1 used in the above-described Example 1.

Figure 5A:
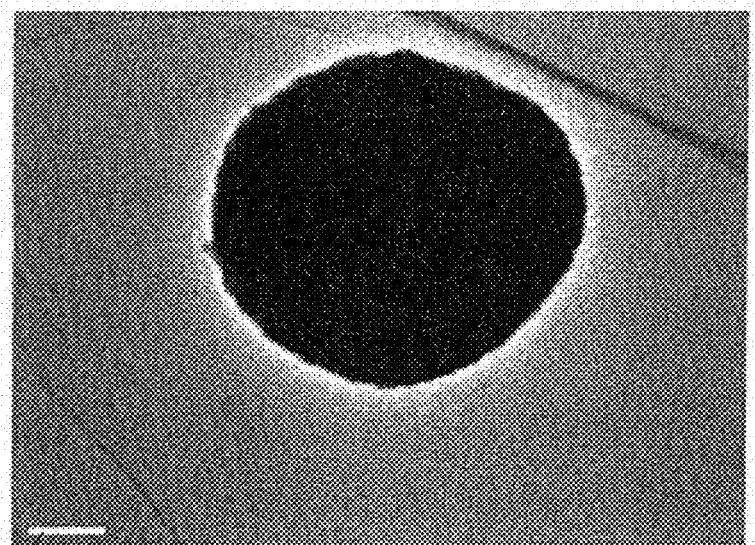
FIG. 5A is a TEM photograph of a constituent particle of non-stoichiometric titanium compound-carbon composite material A-4 according to Comparative Example 2.
Figure 5B:
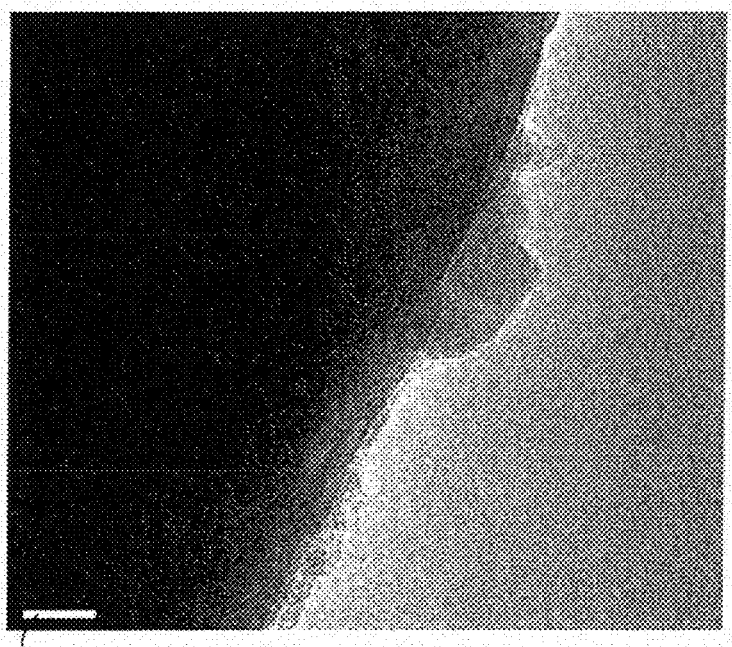
FIG. 5B is a TEM photograph that shows surface vicinity of the particle shown in FIG. 5A.

A TEM photograph of particle constituting A-4 is shown in FIG. 5. The results of TEM-EDX analysis used in measurement of compositions of a core portion and a hybrid layer of the particle are shown in FIGS. 6A and 6B.

Average particle diameter and specific surface area of the obtained carbon-containing composite of non-stoichiometric titanium compound A-4, and surface state (coverage state and Ti:C ratio) of the particles are shown in Table 1.

The obtained carbon-containing composite of non-stoichiometric titanium compound A-4 was used as negative electrode active material to evaluate charge discharge property. The results are shown in Table 1.

TABLE 1

| | | Example 1 | Example 2 | Comparative Example 1 | Comparative Example 2 |
|---|---|---|---|---|---|
| Non-stoichiometric titanium compound | | A-1 | A-2 | A-3 | A-4 |
| Carbon source | Species | PVA-1 | PVA-2 | — | Sucrose |
| | Amount | 10 | 10 | — | 10 |
| Average particle diameter (μm) | | 2.7 | 3.1 | 3.1 | 2.1 |
| Specific surface area (m$^2$g$^{-1}$) | | 43.71 | 33.30 | 1.06 | 16.87 |
| Surface state of particles | Mixed layer | Exist | Exist | None | Defective |
| | Thickness | ca. 20 nm | ca. 20 nm | — | — |
| | Ti:C | 1:8 | 1:8 | — | 1:96 |
| Charge-discharge property (mAh/g) | 0.1 C | 160 | 169 | 168 | 166 |
| | 3 C | 125 | 150 | 98 | 95 |
| | 10 C | 85 | 127 | 56 | 57 |

In both of Example 1 and Comparative Example 2, a single phase exhibiting the similar contrast as Comparative Example 1 that lacked carbon source was observed in the core portion that constituted the major part of the particle. That is, it was confirmed that the core was substantially composed of non-stoichiometric titanium compound.

As shown in FIG. 2B, outer layer covering the core was observed in the surface portion of the particle of Example 1. As shown in FIG. 3B, titanium and oxygen in addition to carbon were detected as the result of EDX analysis of the outer layer. From this result, it is possible to conclude that the outer layer is composed of a mixed layer that includes carbon and non-stoichiometric titanium compound constituting the core.

As shown in Comparative Example 1, the non-stoichiometric titanium compound in which carbon is not introduced by the pretreatment lacks the mixed layer of titanium and carbon on its surface. The lithium ion secondary battery utilizing the non-stoichiometric titanium compound does not exhibit sufficient capacity especially in high rate condition of, for example, 10 C.

As shown in Comparative Example 2, even when carbon source is introduced, the mixed layer having a specific Ti/C ratio is not formed on the particle surface of the composite where the carbon source is not a hydrophilic polymer. Therefore, as like as Comparative Example 1, sufficient capacity is not exhibited in the condition of 10 C.

On the other hand, in Examples 1 and 2, by forming the non-stoichiometric titanium compound-carbon composite material by using hydrophilic polymer as a carbon source, mixed layers (hybrid layers) are formed on the surfaces of particles, and atomic ratios of titanium and carbon in the mixed layers fall within the range of Ti/C=1/50 or more. Therefore, satisfactory capacities are exhibited even under high rate conditions of, for example, 10 C. Further, it was confirmed that the mixed layers in composites of Example 1 and Example 2 were substantially uniformly formed on the surfaces of the particles with a thickness of about 20 nm.

Remarkable deference was not observed in the average particle sizes of Examples 1, 2 and Comparative Examples 1, 2, respectively measured by electron microscope observation after ultrasonic treatment of the particle in ethanol.

On the other hand, Comparative Example 1 shows smaller BET specific surface area than those of Examples 1, 2 and Comparative Example 2, and the coarsening of particles was confirmed in the process of firing. BET specific surface area measured in Comparative Example 2 was smaller than those of Examples 1 and 2. From this result, it is realized that the coarsening of particles can be suppressed where the hydrophilic polymer is used as the carbon source compared to the case of using other type of carbon source.

INDUSTRIAL APPLICABILITY

Non-stoichiometric titanium compound-carbon composite material according to the present invention can be utilized as an electrode active material, specifically as an electrode active material of a lithium ion secondary battery.

The lithium ion secondary battery utilizing the same material can be used in the same manner as the battery generally used as a power source of general devices. In addition, the lithium ion secondary battery may be used, for example, as a thin and small lithium ion secondary battery that can be mounted in IC cards, medical small devices or the like; as lithium ion secondary battery of mobile devices such as cell phones, laptops, digital cameras, and portable game machines or the like; and as a lithium ion secondary battery of large machines such as hybrid vehicles, electric vehicles or the like.

What is claimed is:

1. A non-stoichiometric titanium compound-carbon composite material shown by a chemical formula of $Li_{4+x}Ti_{5-x}O_{12}$, where x is in a range of 0<x<0.30, comprising:
   at least one composite particle that has a core portion comprising the non-stoichiometric titanium compound and a mixed layer formed on a surface of the core portion,
   the mixed layer comprising non-stoichiometric titanium compound and carbon, and having an atomic ratio of titanium to carbon (Ti/C) in a range of from 1/50 to 1/2,
   wherein the mixed layer exists over an entire surface of the core portion, and
   the mixed layer has a thickness of 1 nm or more and 100 nm or less.

2. The non-stoichiometric titanium compound-carbon composite material according to claim 1, wherein a specific surface area thereof determined by BET method is 20 to 100 m$^2$g$^{-1}$.

3. The non-stoichiometric titanium compound-carbon composite material according to claim 1, wherein the composite particle has an average particle diameter of 20 μm or less.

4. The non-stoichiometric titanium compound-carbon composite material according to claim 1, wherein the thickness of the mixed layer is 20 to 100 nm.

5. The non-stoichiometric titanium compound-carbon composite material according to claim 1, wherein a variation of a thickness of the mixed layer is ±20% of an average thickness of the mixed layer.

6. A negative electrode active material comprising the non-stoichiometric titanium compound-carbon composite material according to claim 1.

7. A lithium ion secondary battery comprising a positive electrode, a negative electrode, a separator disposed between the positive electrode and the negative electrode, and an electrolyte, wherein the negative electrode comprises the negative electrode active material according to claim 6.

8. A method for producing the non-stoichiometric titanium compound-carbon composite material according to claim 1, comprising:

performing dissolution of components which are a hydrophilic polymer, a lithium salt, and a titanium alkoxide in an aqueous solvent by adding the components in the solvent and dissolving the components while dispersing the components by agitation;

performing formation of a precursor material by spray-drying a solution obtained by the dissolution; and performing firing of the precursor material under a reduced atmosphere or inert atmosphere at a temperature of not lower than 600° C. and not higher than 900° C.

9. The method of claim 8, further comprising preliminary firing the precursor material under a reduced atmosphere or an inert atmosphere at a temperature of not lower than 300° C. and lower than 600° C. before the firing.

10. The method of claim 8, wherein a polyvinyl alcohol is used as the hydrophilic polymer.

11. The method of claim 10, wherein a viscosity average polymerization degree of the polyvinyl alcohol is 200 to 5000.

* * * * *